United States Patent [19]

Atwood

[11] Patent Number: 4,676,727
[45] Date of Patent: Jun. 30, 1987

[54] MACHINE FOR DIVIDING MASS MATERIAL INTO INDIVIDUAL PIECES

[76] Inventor: Harold T. Atwood, 14151 Irving Ave., Dolton, Ill. 60419

[21] Appl. No.: 849,731

[22] Filed: Apr. 9, 1986

[51] Int. Cl.⁴ ............................................. A21C 3/10
[52] U.S. Cl. ..................................... 425/142; 83/359; 99/460; 99/537; 264/148; 264/163; 425/164; 425/238; 425/311; 425/315
[58] Field of Search ............... 425/238, 239, 279–281, 425/284, 310, 311, 315, 142, 150, 164; 83/467 R, 467 A, 338, 321, 358, 359; 426/503, 512, 516–518; 99/460, 537; 264/145, 148, 163

[56] References Cited

U.S. PATENT DOCUMENTS

| | | | |
|---|---|---|---|
| 1,932,345 | 10/1933 | Kremmling | 425/311 |
| 2,377,668 | 6/1945 | Bole et al. | 425/164 |
| 2,488,046 | 11/1949 | Werner et al. | 425/311 |
| 2,890,662 | 6/1959 | Baiocchi | 425/311 |
| 3,179,069 | 4/1965 | Bartholomew | 425/238 X |
| 3,415,206 | 12/1968 | Reisman | 425/311 |
| 3,568,251 | 3/1971 | Walker | 425/311 |
| 3,737,269 | 6/1973 | Grady | 425/311 X |
| 4,251,201 | 2/1981 | Krysiak | 425/311 X |
| 4,424,236 | 1/1984 | Campbell | 426/503 X |
| 4,460,611 | 7/1984 | Suzuki | 426/512 X |
| 4,562,917 | 1/1986 | Suzuki et al. | 425/142 X |

FOREIGN PATENT DOCUMENTS 109306  6/1984  Japan ................................. 425/311

Primary Examiner—Richard L. Chiesa
Attorney, Agent, or Firm—Benjamin Schlosser

[57] ABSTRACT

This invention relates to means for cutting a mass of material, such as dough or ground meat, into pieces of predetermined shape and of substantially uniform size as the material is fed from a hopper on to a conveyor belt.

2 Claims, 9 Drawing Figures

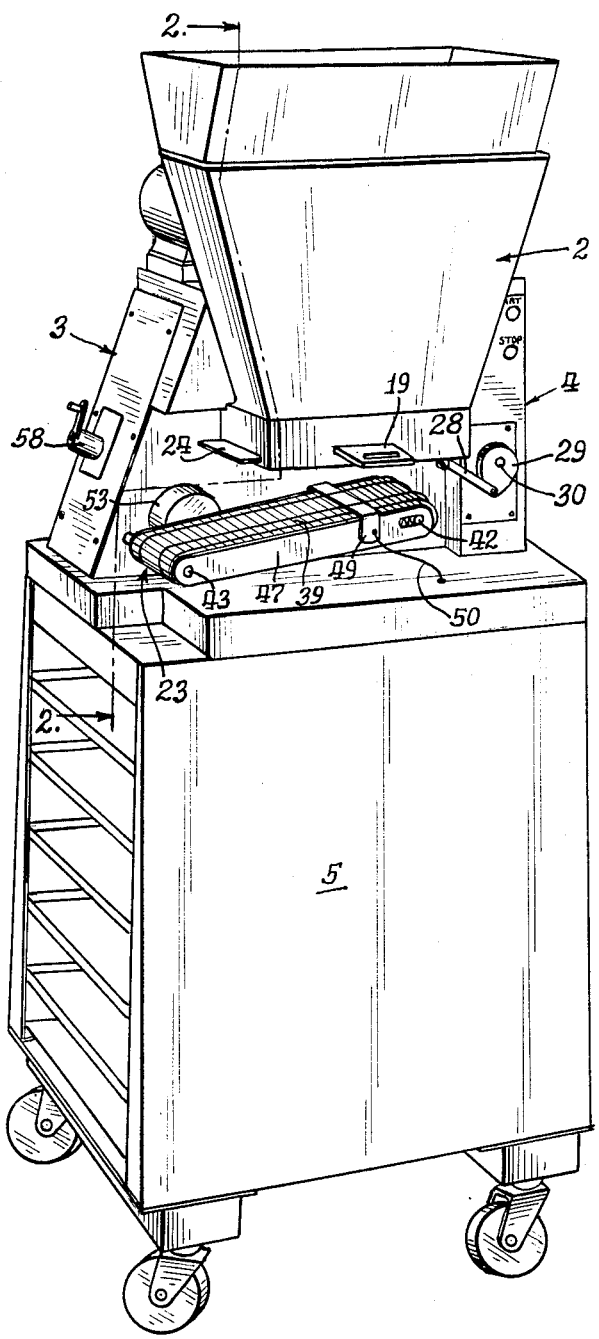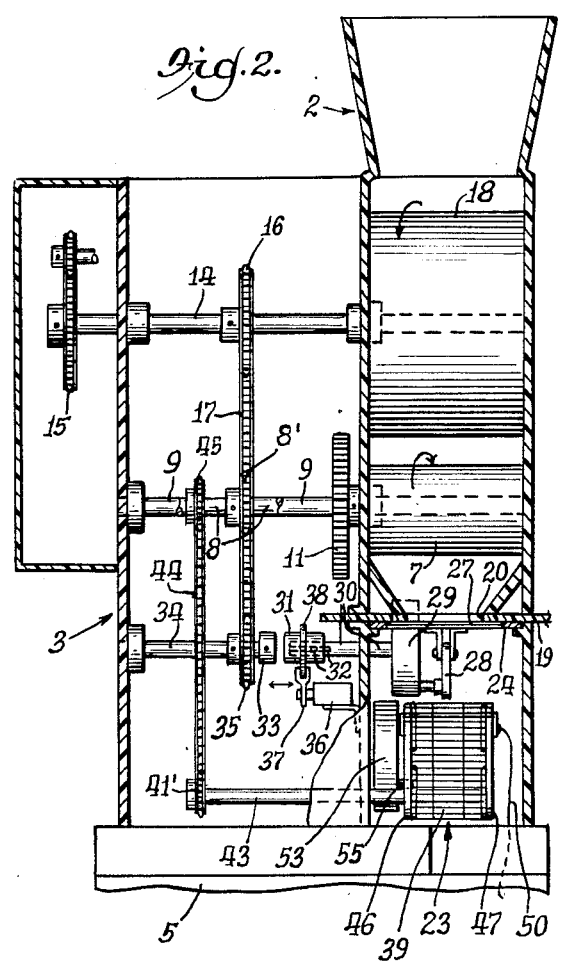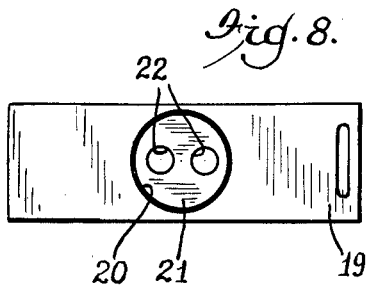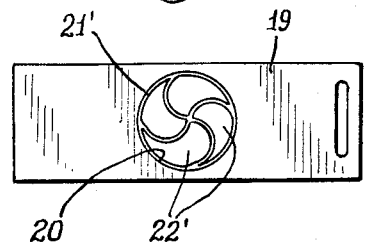

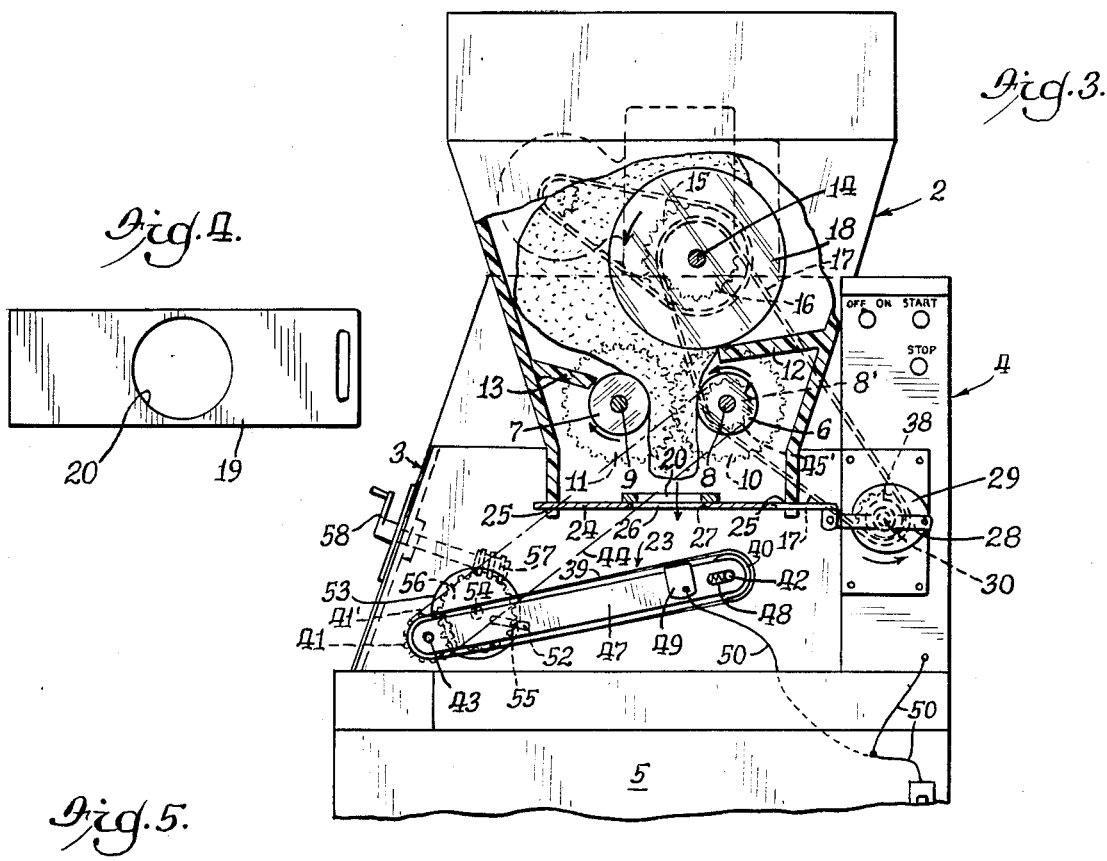
Fig. 3.
Fig. 4.
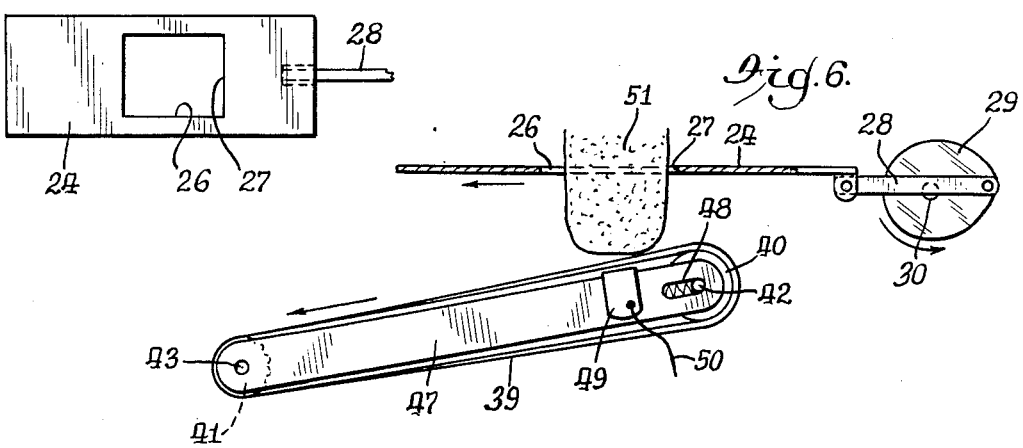
Fig. 5.
Fig. 6.
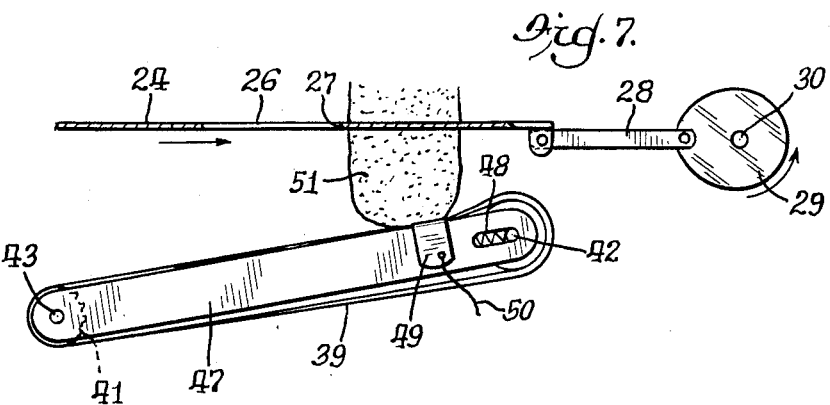
Fig. 7.

MACHINE FOR DIVIDING MASS MATERIAL INTO INDIVIDUAL PIECES

FIELD OF THE INVENTION

This invention is concerned with means for shaping a mass of dough or ground meat or similar material into a continuous strip or strips of predetermined configuration as the material is pulled downwardly through a hopper, and for cutting the strip or strips of material into individual pieces of substantially uniform predetermined size as they are dropped on to a conveyor belt positioned below the discharge opening of the hopper.

SUMMARY OF THE INVENTION

A hopper, adapted to hold a supply of dough or ground meat or similar material, is provided with a plurality of rollers driven by any suitable power means and positioned to cooperate with each other to force the dough or other mass material downwardly through a discharge opening at the bottom of the hopper. A flat plate, having one or more apertures of any desired size and configuration, is slidably mounted adjacent the discharge opening of the hopper to shape the strip or strips of dough or other mass material as it passes through the discharge opening. A cutting blade, slidably mounted adjacent the underside of the flat plate, is adapted to cut the strip or strips of dough or other mass material into pieces of substantially uniform size that are dropped on to a conveyor belt positioned below the hopper. The cutting blade is actuated by an electrical circuit that may be energized either by engagement of the lower end of the strip of material with the conveyor belt or by any suitable timer means.

BRIEF DESCRIPTION OF THE DRAWINGS

FIG. 1 is a perspective view of a machine embodying the invention mounted on a suitable supporting structure;

FIG. 2 is a sectional view, taken along the line 2—2 of FIG. 1;

FIG. 3 is a side view of the machine, with parts broken away to facilitate illustration of the interior structure;

FIG. 4 is a plan view of a flat plate slidably mounted adjacent the discharge opening at the bottom of the hopper;

FIG. 5 is a plan view of the cutting blade slidably mounted adjacent the underside of the flat plate shown in FIG. 4;

FIG. 6 is a diagrammatic view showing the cutting blade in its retracted position;

FIG. 7 is a diagrammatic view showing the cutting blade immediately after it has severed the lower end of the strip of dough or other material after it has passed through the opening in the flat plate shown in FIG. 4;

FIG. 8 is a plan view showing a modified form of the flat plate shown in FIG. 4; and FIG. 9 is a plan view of another modified form of the flat plate of FIG. 4.

DESCRIPTION OF THE PREFERRED EMBODIMENT

In the drawings, an open top hopper 2, a gear housing 3, and an electrical control box 4 are mounted on a cabinet 5, or other suitable supporting member, such as a table or bench, for example. The hopper 2 is provided with a pair of oppositely disposed rollers 6 and 7 adapted to force the dough, or other material, such as ground meat, for example, that is to be divided, downwardly through a discharge opening at the bottom of the hopper. The roller 6 is fixed to a shaft 8 rotatably mounted within the housing 3, and the roller 7 is fixed to a shaft 9 rotatably mounted within the housing 3 in parallel spaced relationship to the shaft 8. Gears 10 and 11, mounted respectively on the shafts 8 and 9, are intermeshed so that counterclockwise rotation of the shaft 8, which is effected by gearing hereinafter described, causes the gear 10 to rotate the shaft 9 in clockwise direction. A pair of baffles 12 and 13 extending inwardly from opposite end walls of the hopper 2, as shown in FIG. 3, prevent the dough, or other material being divided, from moving upwardly between either roller 6 or 7 and the adjacent wall of the hopper to mix with the bulk of the material contained within the hopper.

A shaft 14, rotatably mounted within the hopper 2 in parallel relationship to the shafts 8 and 9, but located closer to the top of the hopper, has two gears 15 and 16 fixed thereto. The gear 15 is driven by any suitable motor, and the gear 16 drives the shaft 8 by means of a chain 17 engaging a gear 8', fixed to the shaft 8. The dough, or other material that is to be divided, is placed within the hopper 2 and is forced downwardly into engagement with the rollers 6 and 7 by a roller 18, which is mounted on the shaft 14. The hopper 2, each of the rollers 6, 7 and 18, and each of the baffles 12 and 13 are all preferably made of a hard non-conducting material, such as polyethylene, for example, which has a non-stick surface.

A flat plate 19, also preferably made of polyethylene, is slidably mounted adjacent the bottom of the hopper. The plate 19 is manually movable between one position, in which it forms a closure for the discharge opening at the bottom of the hopper, and a second position in which an opening 20, provided in the plate 19, is positioned directly beneath the discharge opening of the hopper. A plug 21, fitting tightly into the opening 20, is inserted into the opening with its upper surface flush with the upper surface of the plate 19. Several plugs, similar to the plug 21, and eaoh having identical outside dimensions, are provided for the plate 19, and may be selectively inserted into the opening 20. In FIG. 8, the plug 21 is provided with two apertures 22, but it will be understood that the different plugs may have one or more apertures. The apertures of different plugs may be of different sizes, limited only by the surface area of the plug.

The dough that is forced downwardly through the discharge opening of the hopper must pass through the aperture or apertures in the plug, and is shaped by the configuration of the apertures. As the dough moves downwardly toward the conveyor it is severed, in a manner hereinafter described, by a cutting blade 24. After the dough is severed by the blade 24 it drops on to the conveyor in the form of individual pieces of dough. When the plug 21 is used, the individual pieces of dough are in the form of flat circular disks that may be baked in the shape in which they are deposited on the conveyor. However, these flat dough disks are usually molded into different shapes and then baked to form different types of rolls. When the plug 21' is used, the dough passing through the discharge opening at the bottom of the hopper is divided into four individual strips that are interengaged and are severed simultaneously. Each of the four individual strips are so shaped by the apertures 22' that each unit of dough dropping on to the conveyor has the configuration of a kaiser roll and may be baked without further shaping.

It is possible to use a single plate 19 with a plurality of different interchangeable plugs, but it is preferred to provide a plurality of interchangeable plates 19, each with a different plug secured within its opening 20. When it is desired to change the size or shape of the individual pieces of dough being deposited on the conveyor, the particular plate being used is manually removed from the machine, and is replaced by a different plate having a plug provided with apertures of the desired size and configuration. Normally a plug is removed from its plate only when it is worn out or broken.

As shown in FIG. 3, the cutting blade 24 is slidably mounted in a pair of slots 25 in two opposite walls of the hopper 2. The slots 25 provide bearing surfaces for the cutting blade and hold it adjacent the underside of the flat plate 19. As shown in FIG. 5, the cutting blade is provided with a large opening 26. The opening 26 is positioned in vertical alignment with the discharge opening of the hopper between successive strokes of the cutting blade. The dough forced downwardly through the discharge opening of the hopper and the apertures in the plug of the slidable plate 19 passes through the opening 26 as the dough moves toward the conveyor 23. The rear edge 27 of the opening 26 serves as the cutting edge of the blade 24. The cutting blade 24 has its rear end secured to one end of a crank arm 28. The other end of the crank arm 28 is secured to a cam 29 mounted on a shaft 30 projecting into the gear housing 3. A clutch 31 is mounted on the end of shaft 30 remote from the cam 29. A pin and slot connection 32 permits a limited sliding movement of the clutch relative to the shaft 30 so that the clutch may be moved into and out of engagement with a clutch housing 33 rigidly secured to a shaft 34. A gear 35, mounted on the shaft 34, is engaged by the chain 17. The interengagement of the chain 17 and the gear 35 causes the shaft 34 to rotate continuously as long as the rollers 6, 7 and 18 are rotated.

A solenoid 36, mounted within the gear housing 3, in close proximity to the clutch 31, is energized in a manner hereinafter described. A forked member 37 is secured to the post of the solenoid and has its forked end engaging a collar 38 extending circumferentially from the clutch 31. Each time the solenoid is energized it pushes the clutch 31 outwardly into engagement with the clutch housing 33 long enough to rotate the cam shaft 30 through one complete rotation. As soon as the cam shaft completes one rotation, the solenoid pulls the clutch 31 out of the clutch housing 33 to stop the rotation movement of the cam 29. Each rotation of the cam 29 moves the cutting blade forwardly to sever the dough passing through the aperture 26 and then retracts the cutting blade to position it for the next cutting operation.

As each piece of dough is severed by the cutting blade it drops on to the conveyor 23. The conveyor comprises a metal belt 39 positioned below the hopper 2 and having one end traversing the area directly below the discharge opening at the bottom of the hopper. The conveyor belt consists of an endless metal strip entrained around a pair of gears 40 and 41 that are secured respectively to a pair of shafts 42 and 43. The conveyor belt is driven by a chain 44 which engages a gear 41' mounted on the shaft 43, and a gear 45 which is mounted on the shaft 8. The shafts 42 and 43 are held in spaced parallel relationship by a pair of rigid bars 46 and 47 that are secured to the shafts 42 and 43 adjacent opposite edges of the conveyor belt 39. The upper end portions of the bars 46 and 47 are provided with slightly elongated apertures 48 which support the ends of the shaft 42 and permit limited pivotal movement of the bars 46 and 47 about the shaft 43.

The gears 40, 41 and the bars 46, 47 are all made of polyethylene to prevent any short circuits in the electrical system controlling the operation of the machine. A metal plate 49 is secured to one of the bars 46 or 47, and extends across the conveyor in spaced relationship to the upper surface of the conveyor belt 39. A wire 50 connects the plate 49 to an electrical circuit adapted to energize the solenoid 36 when the circuit is closed. The other end of the circuit is connected to the conveyor belt 39 so that the solenoid is energized when the conveyor belt moves into contact with the metal plate 49. The dough 51 passing through the aperture or apertures 22 passes through the opening 26 in the cutting blade and then downwardly into engagement with the upper surface of the conveyor belt 39. Continued downward movement of the dough forces the conveyor belt downwardly into engagement with the metal plate 49, thus closing the electrical circuit and energizing the solenoid 36.

Each time the solenoid is energized it rotates the cam 29 through one complete revolution, thus moving the cutting blade 25 forwardly to sever the dough extending downwardly through the opening 26, and then retracting the cutting blade to position it for the next cutting operation. The length of each piece of dough severed from the strip of dough 51 passing downwardly through the apertures 22 and 26 is determined by the distance between the cutting blade and the surface of the conveyor belt directly below the discharge opening of the hopper. This distance may be increased or decreased by moving the conveyor 23 pivotally about the shaft 43 in a manner hereinafter described.

The bar 46 has a slot 52 spaced a short distance from the shaft 43. The slot 52 extends at an angle deviating from the horizontal plane very slightly. A roller 53, fixed to a shaft 54 adjacent to one end of the slot 52, has a pin 55 projecting from its end closest to the bar 46. The pin 55 extends into the slot 52 and moves the conveyor 23 pivotally about the shaft 43 as the roller 53 is rotated. A gear 56, fixed to the shaft 54, is engaged by a worm 57 that may be turned manually by a handle 58 that projects through one wall of the gear housing. The pivotal movement of the conveyor is limited by the length of the slot 52.

I claim:

1. In a machine for dividing mass material into individual pieces, a hopper having a discharge opening at its lower end, a flat plate slidably mounted adjacent said discharge opening, said plate having an aperture therein and being movable between a position in which it closes said discharge opening and a position in which said aperture is in vertical alignment with said discharge opening, a cutting blade slidably mounted adjacent said flat plate, said cutting blade being adapted to cut dough passing through said aperture into pieces of predetermined size, and electrically controlled means for reciprocating said cutting blade in a plane adjacent one side of said plate, said electrically controlled means including a normally open electrical circuit, a metal conveyor belt positioned below said discharge opening and comprising an integral portion of said electrical circuit, said electrical circuit having a terminal mounted in spaced relationship to said conveyor belt, said conveyor belt being movable into contact with said terminal by the force exerted by dough passing through the discharge opening of said hopper into engagement with said conveyor belt, thereby closing said electrical circuit.

2. A machine as recited in claim 1 in which said conveyor belt comprises an endless metal strip entrained around two rollers of non-conductive material held in spaced relationship by a rigid bar.

* * * * *